United States Patent
Elyasi et al.

(10) Patent No.: US 11,126,359 B2
(45) Date of Patent: Sep. 21, 2021

(54) PARTITIONING GRAPH DATA FOR LARGE SCALE GRAPH PROCESSING

(71) Applicant: Samsung Electronics Co., Ltd., Suwon-si (KR)

(72) Inventors: Nima Elyasi, State College, PA (US); Changho Choi, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 151 days.

(21) Appl. No.: 16/255,815

(22) Filed: Jan. 23, 2019

(65) Prior Publication Data

US 2020/0183604 A1 Jun. 11, 2020

Related U.S. Application Data

(60) Provisional application No. 62/777,051, filed on Dec. 7, 2018.

(51) Int. Cl.
*G06F 3/06* (2006.01)
*G06F 16/901* (2019.01)

(52) U.S. Cl.
CPC .......... *G06F 3/0644* (2013.01); *G06F 3/0604* (2013.01); *G06F 3/0679* (2013.01); *G06F 16/9024* (2019.01)

(58) Field of Classification Search
CPC .... G06F 3/0644; G06F 3/0604; G06F 3/0679; G06F 16/9024
See application file for complete search history.

(56) References Cited

U.S. PATENT DOCUMENTS

| | | |
|---|---|---|
| 9,734,607 B2 | 8/2017 | Macko et al. |
| 2014/0320497 A1 | 10/2014 | Vojnovic et al. |
| 2017/0091246 A1 | 3/2017 | Risvik et al. |
| 2019/0179714 A1* | 6/2019 | Karthikeyan ......... G06F 3/0619 |
| 2019/0278808 A1* | 9/2019 | Xia ..................... G06F 16/9024 |

OTHER PUBLICATIONS

Zheng, Da et al., "FlashGraph: Processing Billion-Node Graphs on an Array of Commodity SSDs", 13th USENIX Conference on File and Storage Technologies (FAST '15), Feb. 16-19, 2015, Santa Clara, CA, USA.

* cited by examiner

*Primary Examiner* — Kalpit Parikh
(74) *Attorney, Agent, or Firm* — Renaissance IP Law Group LLP (57) ABSTRACT

Inventive aspects include a method, apparatus, and system for partitioning and processing graph data for large-scale graphs. Such may include, in a partitioning pre-processing step, assigning a plurality of destination vertices to a plurality of partitions such that each destination vertex of the plurality of destination vertices is uniquely assigned to only one partition from among the plurality of partitions. Such may also include, in a main execution of external graph processing step, (i) loading a given partition of destination vertices from among the plurality of partitions from a solid state drive (SSD) into a main memory of a computing machine, (ii) streaming one or more chunks of source vertex data from the SSD into the main memory of the computing machine, and (iii) performing graph processing based at least on the loaded given partition of destination vertices and the streamed one or more chunks of source vertex data.

14 Claims, 8 Drawing Sheets

PARTITIONING GRAPH DATA FOR LARGE SCALE GRAPH PROCESSING

BACKGROUND

The present inventive concepts relate to large-scale graph processing, and more-particularly, to a graph data coordinator and methods for partitioning large-scale graph processing.

Large-scale graph processing is widely used in social network analysis, recommendation systems, and extracting features from human genes. With graph dataset size growing over time, it is no longer efficient nor feasible to store all graph data in main memory (e.g., in volatile memory such as Dynamic Random Access Memory, referred to generally as DRAM). Hence, the rapidly evolving graph dataset size mandates storing graph data on a non-volatile drive such as a solid state drive (SSD). This results in many fine-grained random accesses to the SSD, consequently delaying the execution of graph analytics application as well as deteriorating the SSD lifetime. In a type of graph processing framework which stores all graph data on SSD and loads the data to the main memory to run the external graph processing, the intermediate fine-grained data is first logged on the SSD, sorted after each iteration, and finally stored on the SSD. The sort phase imposes significant overhead and increases the execution time. Moreover, the cost of sorting is significantly exacerbated over time given that the graph dataset sizes are growing.

What is needed is an improved graph data coordinator and method for partitioning graph data for large-scale graph processing.

BRIEF SUMMARY

Embodiments may include a computer-implemented method for partitioning graph data for large-scale graph processing. The method may include, in a partitioning pre-processing step, assigning a plurality of destination vertices to a plurality of partitions such that each destination vertex of the plurality of destination vertices is uniquely assigned to only one partition from among the plurality of partitions. The method may include, in a main execution of external graph processing step, (i) loading a given partition of destination vertices from among the plurality of partitions from a solid state drive (SSD) into a main memory of a computing machine, (ii) streaming one or more chunks of source vertex data from the SSD into the main memory of the computing machine, and (iii) performing graph processing based at least on the loaded given partition of destination vertices and the streamed one or more chunks of source vertex data.

Some embodiments include a computing machine, comprising a graph data coordinator logic section configure to perform a partitioning pre-processing step to assign a plurality of destination vertices to a plurality of partitions such that each destination vertex of the plurality of destination vertices is uniquely assigned to only one partition from among the plurality of partitions. The graph data coordinator logic section is configured to perform a main execution of external graph processing step. The graph data coordinator logic section is configured to load a given partition of destination vertices from among the plurality of partitions from a solid state drive (SSD) into a main memory of a computing machine. The graph data coordinator logic section is configured to stream one or more chunks of source vertex data from the SSD into the main memory of the computing machine. The graph data coordinator logic section is configured to perform graph processing based at least on the loaded given partition of destination vertices and the streamed one or more chunks of source vertex data.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first graph could be termed a second graph, and, similarly, a second graph could be termed a first graph, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

To effectively exploit the available capacity of an SSD and expedite the execution of graph applications, embodiments disclosed herein partition graph data such that the vertex data associated with each partition fits in the DRAM and gets immediately updated. Once each partition is processed, its associated data is written back to the SSD. Hence, the fine-grained accesses happen in main memory DRAM instead of the SSD. This provides sequential coarse grain accesses to the SSD and helps reduce the execution time of large-scale graph analytics.

Embodiments disclosed herein include a greedy partitioning mechanism for vertex data such that the destination vertices in each partition from among a group of partitions readily fit in main memory DRAM space, hence eliminating the need for sorting the intermediate fine-grained data. The partitioning is done prior to the execution as a pre-processing phase.

The vertex may be partitioned data based on destination vertices. Fine-grained and slow I/O accesses may instead be converted to high-speed memory accesses. Random fine-grained I/O accesses may be coalesced and made sequential coarse-grained accesses. Another advantage is that the typical need for sorting intermediate data generated in each iteration of execution is eliminated.

Figures 1, 2:
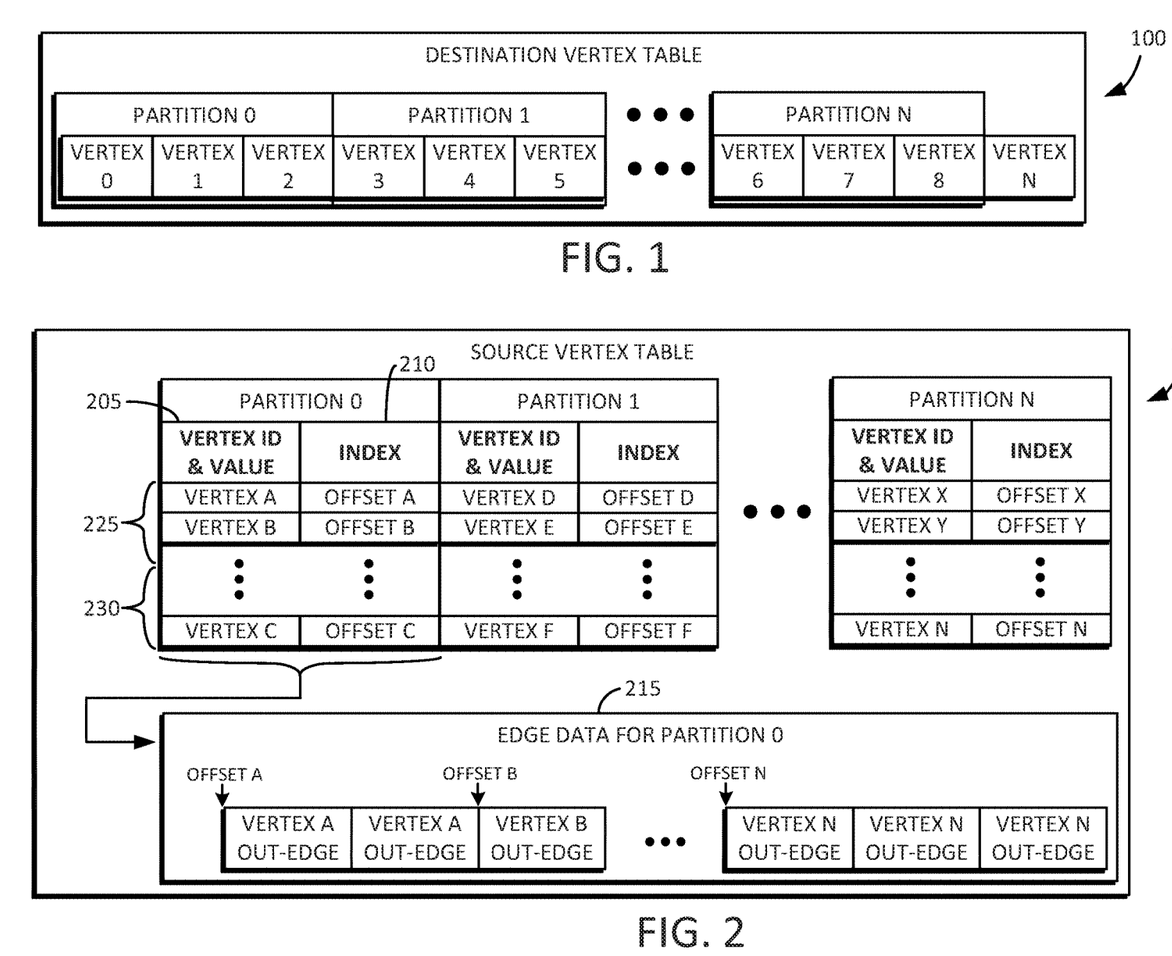
FIG. 1 is an example diagram of a destination vertex table including various partitions each including vertices in accordance with embodiments disclosed herein.
FIG. 2 is an example diagram of a source vertex table including various partitions each including vertex ID, value, associated index, and edge data in accordance with embodiments disclosed herein.

FIG. 1 is an example diagram of a destination vertex table 100 including various partitions (e.g., Partition 0, Partition 1, through Partition N) each including vertices (e.g., Vertex "0," Vertex "1," etc.) in accordance with embodiments disclosed herein. FIG. 2 is an example diagram of a source vertex table 200 including various partitions (e.g., Partition 0, Partition 1, through Partition N) each including vertex ID & value 205, associated index 210, and edge data 215 in accordance with embodiments disclosed herein. Reference is now made to FIGS. 1 and 2.

Embodiments disclosed herein include a greedy partitioning mechanism for external graph processing when running on very large graph datasets. A graph comprises a set of vertices, and a set of edges connecting those vertices. The vertices connected to each vertex "v" are called the neighbors of "v." For a vertex "u," the edge "e" (i.e., represented by "→" such as "u→v") is called an "out edge" of "u" and an "in edge" of "v." To process a graph, each vertex requires to have its neighbor's information (e.g., ID and value, etc.).

As shown in FIGS. 1 and 2, the destination vertex table 100 and the source vertex table 200 may be used to process large-scale graphs. Graph data may be stored in two sections: (i) vertex ID and value 205 (e.g., such as its rank in PageRank), and an index 210 indicating the beginning offset (e.g., Offset A, Offset B, through Offset N, etc.) of the vertex's neighbors; and (ii) edge data 215, which includes the set of neighbors (e.g., ID of neighboring vertices) for each vertex and any edge information (e.g., distance from source). The source vertices (e.g., Vertex "A," Vertex "B," etc.) for each partition (e.g., Partition 0, Partition 1, etc.) may be divided into mirror vertices (e.g., 225) and master vertices (e.g., 230), as further described below.

For processing large-scale graphs, a vertex-centric processing model is employed to enable parallelizing external graph processing execution in a distributive fashion. This processing model is preferably accomplished using a single discrete machine, such as a single computer server. In some embodiments, parallelizing graph processing may be performed using multiple processing units or processing threads such that each vertex runs a vertex program which reads the current vertex information as well as its neighboring vertices. After running some computation (specified by the graph processing technique), a vertex may require to update itself and/or send updates to its neighbors. Graph processing frameworks which employ a vertex-centric execution model may store the vertex data on main memory (e.g., DRAM) and store the edge data on the secondary storage (e.g., SSD). Conventionally, updates to the neighboring vertices require many fine-grained random accesses since the value of each neighbor vertex can be as small as a 4 byte integer. In accordance with embodiments disclosed herein, when storing the vertex data in main memory, which is byte-addressable, these fine-grained random updates occur to the main memory, which can better handle them. Accesses to edge data, on the other hand, are usually sequential and more coarse-grained, and so can be handled nearly just as well by the SDD.

With graph dataset sizes growing, storing even vertex data in the main memory requires huge amounts of DRAM space, which is more expensive than SSD space. Thus, given a limited amount of DRAM space to run the graph application, even vertex data needs be stored on the SSD and be read into the main memory in different time intervals. When storing the vertex data on the SSD, with access granularity of an SSD page (e.g., 8 KB), each fine-grained random update (e.g., 4 B) would otherwise mandate a whole SSD page write. The miss-match between SSD page size and vertex value updates would otherwise be very detrimental to the SSD lifetime and the application performance. In contrast, embodiments disclosed herein use a low-cost partitioning mechanism for the vertex data, which can be done off-line in a pre-processing phase, thereby, converting fine-grained random updates to neighboring vertices to coarse-grained sequential accesses, in order to effectively improve SSD lifetime and application performance.

Embodiments disclosed herein partition the vertex data and process each partition by reading its respective vertex data into main memory followed by streaming the edge data from secondary storage (e.g., SSD) to the main memory. The disclosed partitioning mechanism employs a greedy technique to partition the vertex data. Since in each iteration, updates happen to the destination vertices, embodiments disclosed herein (i) split the destination vertices (e.g., Vertex "0," Vertex "1," through Vertex "N") and assign each subset of them to corresponding partitions (e.g., Partition "0," Partition "1," through Partition "N"), and (ii) store the "in edges" of destination vertices associated to each partition separately along with their indexing information. Thus, after performing a pre-processing/partitioning graph data step, as further described below, the following three files may be stored on the SSD and processed consecutively: (i) destination vertex data (e.g., destination vertex table 100), (ii) source vertex data and its indexing information of their neighbors (e.g., source vertex table 200), IDs of which are stored in (iii) edge data (e.g., edge data 215).

The greedy partitioning technique for vertex data may be performed as a pre-processing step (e.g., offline). Vertex data may be partitioned on the SSD such that each destination vertex is assigned to only one partition. Destination vertex data for each partition is transferred to the memory and kept there until the partitions are processed. The rest of the data (e.g., source vertex data and edge data) may be streamed into the main memory from the SSD in chunks, as further described below. This enables running external graph processing on a single discrete machine, even if the single machine has a limited amount of main memory.

Figure 3A:
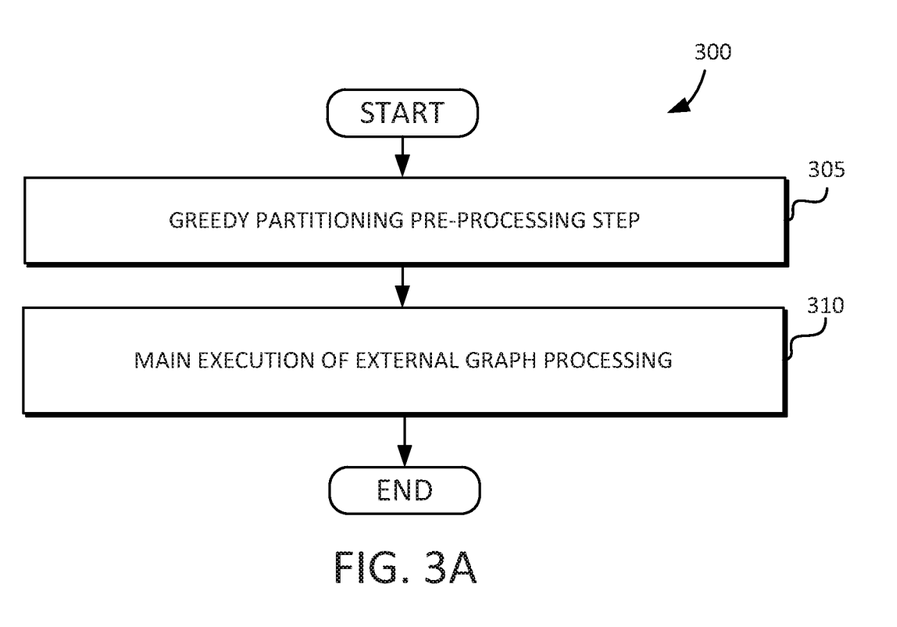
FIG. 3A is an example flow diagram illustrating a technique for performing a greedy partitioning pre-processing step followed by a main execution of external graph processing in accordance with embodiments disclosed herein.

FIG. 3A is an example flow diagram 300 illustrating a technique for performing a greedy partitioning pre-processing step 305 followed by a main execution 310 of external graph processing in accordance with embodiments disclosed herein. The technique begins at 305 where a greedy partitioning pre-processing step 305 is performed, which is further described in detail below with reference to FIG. 3B. After the greedy partitioning pre-processing step 305, a main execution of external graph processing is performed at 310, which is further described in detail below with reference to FIGS. 4A, 4B, 5, and 6.

Figure 3B:
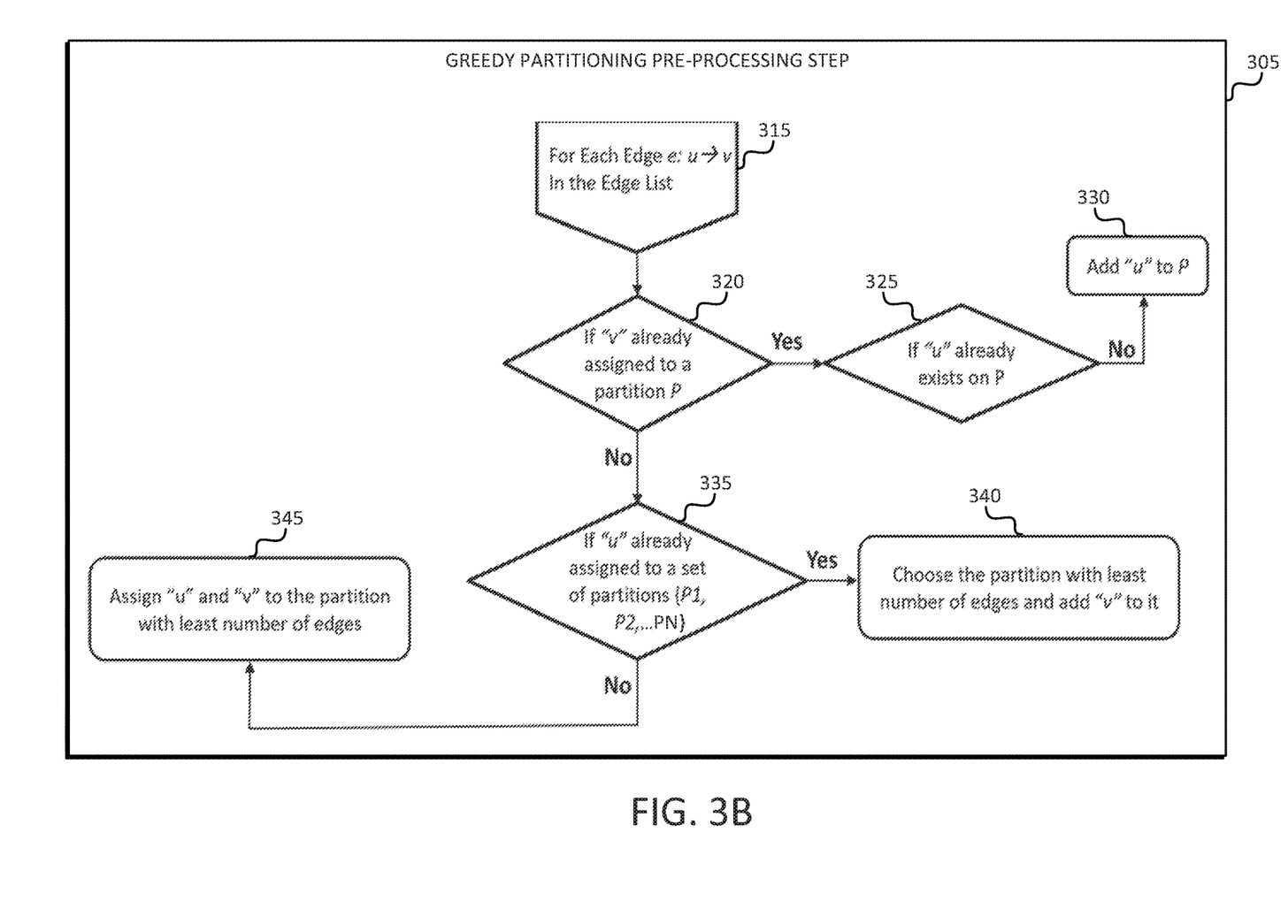
FIG. 3B is an example flow diagram illustrating additional details of the greedy partitioning pre-processing step of FIG. 3A in accordance with embodiments disclosed herein.

FIG. 3B is an example flow diagram illustrating additional details of the greedy partitioning pre-processing step 305 of FIG. 3A in accordance with embodiments disclosed herein. Via this partitioning pre-processing step 305, destination vertices (e.g., Vertex "0," Vertex "1," Vertex "2," etc.) are uniquely assigned to each partition (e.g., Partition "0"). Put differently, vertex data may be partitioned on the SSD such that each destination vertex is assigned to only one partition. However, source vertices (e.g., Vertex "A," Vertex "B," Vertex "C," etc.) can have duplicates on different partitions (e.g., Partition 1, Partition N, etc.). The goal of this greedy partitioning is to minimize the number of duplicate vertices (i.e., generally referred to herein as "mirrors") while preserving the destination vertex uniqueness.

For each edge "e" (i.e., u→v) as indicated at 315: when vertex "v" is already assigned to a partition "P" as indicated at 320, then vertex "u" is added to the same partition "P" as indicated at 330, as long as the vertex "u" does not already exist on that partition as indicated at 325. In other words, when the vertex "u" does not already exist on the partition "P," then the vertex "u" is added to the partition "P."

Referring back to 320, when the vertex "v" is not already assigned to any partition yet, then the vertex "u" is checked at 335. At 335, when the vertex "u" is already assigned to a set of partitions {P1, P2, . . . }, the partition that includes the least number of edges is chosen at 340, and the vertex "v" may be added or otherwise assigned to that partition. Otherwise, when "u" is not assigned to any partition yet at 335, then the vertices "u" and "v" may be added or otherwise assigned to the partition with least number of edges at 345.

This greedy partitioning pre-processing technique can guaranty that each destination vertex is uniquely assigned to a partition and that it does not have any mirrors. In other words, while source vertices may have mirrors, it can be guaranteed that destination vertices do not. After this phase, the destination vertices' labels may be changed with respect to their new order. These changes may also be reflected on the respective source vertices and edge data. Further, when processing each partition, destination vertices for each partition can fit in the main memory and get updated consequently. When the greedy partitioning pre-processing step 305 is completed, then the graph processing technique 310 may be performed on the partitioned graph data. The greedy partitioning may be performed off-line and as a pre-processing step, the latency of which does not negatively impact the latency of execution time of the graph processing technique. Next, the execution model for the graph processing technique execution is described.

Figure 4A:
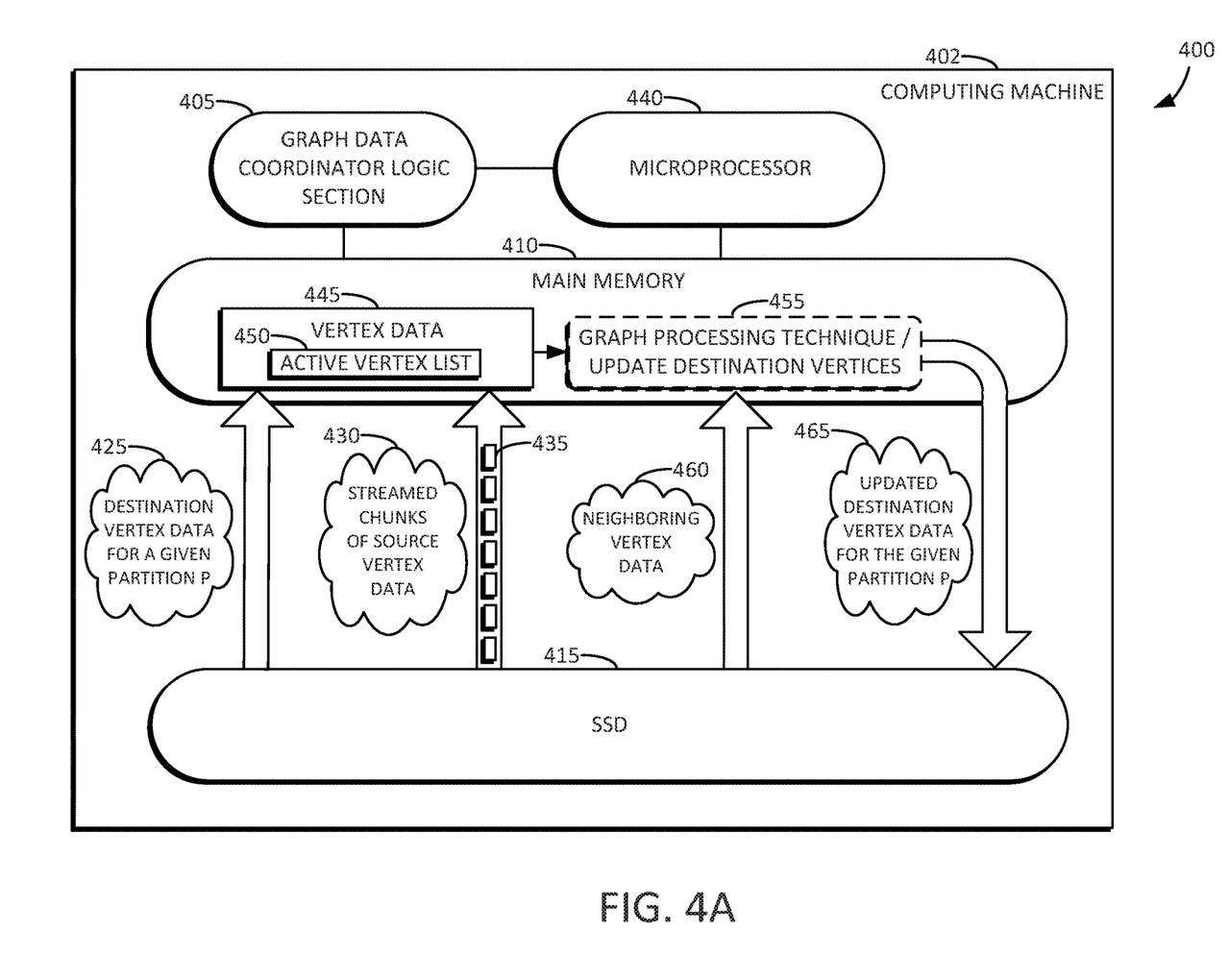
FIG. 4A is an example block and flow diagram of a computing machine including a graph data coordinator logic section, and the flow and processing of data between main memory and an SSD in accordance with embodiments disclosed herein.

FIG. 4A is an example block and flow diagram 400 of a computing machine 402 including a graph data coordinator logic section 405, and the flow and processing of data between main memory 410 and an SSD 415 in accordance with embodiments disclosed herein.

Partitions (e.g., from destination vertex table 100) may be processed consecutively. For each partition, a series of processing steps can be performed. First, destination vertex data associated with a given partition "P" may be loaded by the graph data coordinator logic section 405 at 425 into the main memory 410 from a disk such as the SSD 415. Second, depending on the graph processing technique, either a subset of source vertex data or the entire source vertex data 430 is transferred into main memory from the SSD 415, in streamed chunks 435 of source vertex data 430, and processed subsequently. More specifically, a chunk 435 of source vertex data (e.g., 32 MB) may be transferred to the main memory 410 from the SSD 415, including the vertex values (e.g., 210 from FIG. 2) and the indices (e.g., 210 of FIG. 2) to locate their neighboring vertices. In some embodiments, all of or substantially all of the source vertex data is streamed into the main memory 410 in 32 MB chunks 435. It will be understood, however, that the chunks 435 may have a different size such as 16 MB or 64 MB without departing from the inventive concept disclosed herein. This further provides parallelism opportunities. This step and the following steps can run in parallel (i.e., simultaneously). Moreover, decisions regarding which vertex data is currently active, can be made either on-the-fly (i.e., in real-time) or when the source vertex data 430 is completely transferred into the main memory 410. Thus, the information of active source vertex data is determined and the set of active vertices 445 are processed by the graph data coordinator logic section 405, the microprocessor 440, or both.

An active vertex list 450 may be processed in order. For each source vertex in the active vertex list 450, an index of its neighbors may be extracted from vertex data 445, indicating the byte offset (e.g., Offset A, Offset B, etc.) of its neighbors in the edge data file (e.g., 215 of FIG. 2). By reading two indices (i.e., beginning index of two successive vertices), the graph data coordinator logic section 405 can extract the start and end byte offsets of that vertex's neighbors and transfer them from SSD 415 to the main memory 410, as shown at 460. Subsequently, for a chunk (e.g., 435) of source data 430 present in the main memory 410, all the required information to run the graph processing technique exists in the main memory 410 including the source vertex value, destination vertices in the current partition, and the neighboring information of source vertices associated with this source data chunk 435. This means that all of the updates to the neighboring vertices of source vertices may happen to the set of destination vertices present in the main memory 410, and thus eliminates the need for either fine-grained random I/O accesses or sorting overhead that would otherwise be required when performing such actions in the SSD 415.

Next, the graph processing technique may be run on each source vertex and the updates are generated for the destination vertices at 455. As an example, in the PageRank algorithm, the rank (i.e., value) of each source vertex is sent to the destination vertices. The ranks are accumulated in each vertex data and dampen by a factor specified for this algorithm (e.g., divided by 0.15). When processing (e.g., 455) for the source data associated with the current partition is complete, the updated destination vertex data 465 for this partition (e.g., partition "P") may be stored on the SSD 415.

In each iteration of execution, for a given partition "P," the graph data coordinator logic section 405 may perform the following: i) load vertex data 425 for the given partition "P" from the SSD 415 to the main memory 410; ii) stream source vertex data 430 for the given partition "P" from the SSD 415 into the main memory 410 (e.g., streamed by reading chunks of 32 MB of data at a time); and iii) read neighboring information 460 for each chunk of source vertices by accessing the edge data file (e.g., 215 of FIG. 2) from the SSD 415. The offsets (e.g., Offset "A," Offset "B," etc.) of neighbors in the edge file 215 for each source vertex (e.g., Vertex "A," Vertex "B," etc.) may be stored as an offset in the source vertex data file 200. The graph data coordinator logic section 405 may run the graph processing technique, and then update the destination vertices for the partition "P" in the main memory 410. When processing for the partition "P" is finished, the graph data coordinator logic section 405 may update the destination vertices at 455 and store the updated destination vertices for the partition "P" on the SSD 415. The graph data coordinator logic section 405 may iterate through each of the partitions, executing each of these steps. When all partitions have been processed, the graph data coordinator logic section 405 may read destination vertex data for each partition and update the corresponding mirrors on other partitions, as further described below with reference to FIGS. 4B and 5.

Figure 4B:
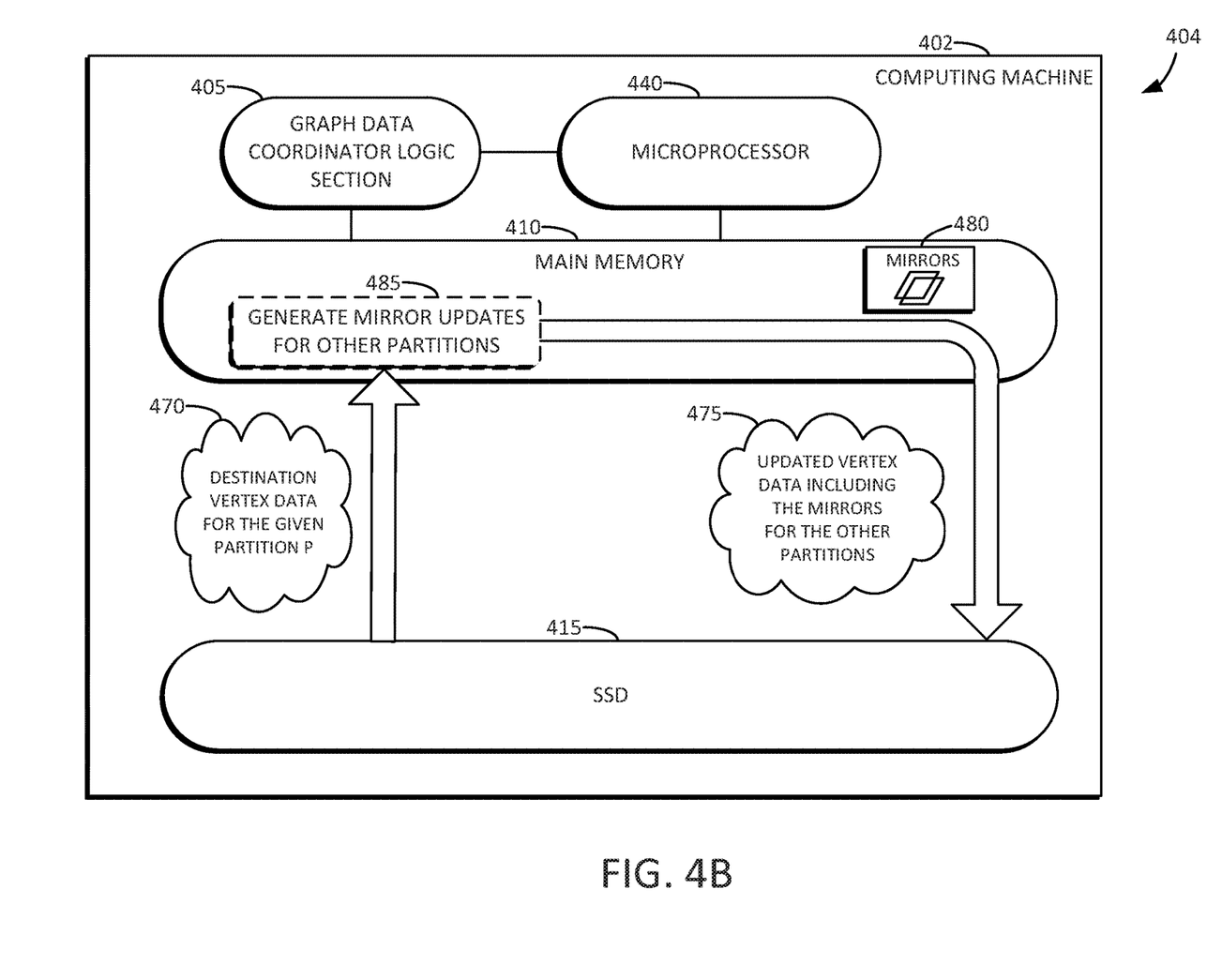
FIG. 4B is an example block and flow diagram of the computing machine of FIG. 4A including the graph data coordinator logic section, and the flow and processing of additional data between main memory and an SSD in accordance with embodiments disclosed herein.
Figure 5:
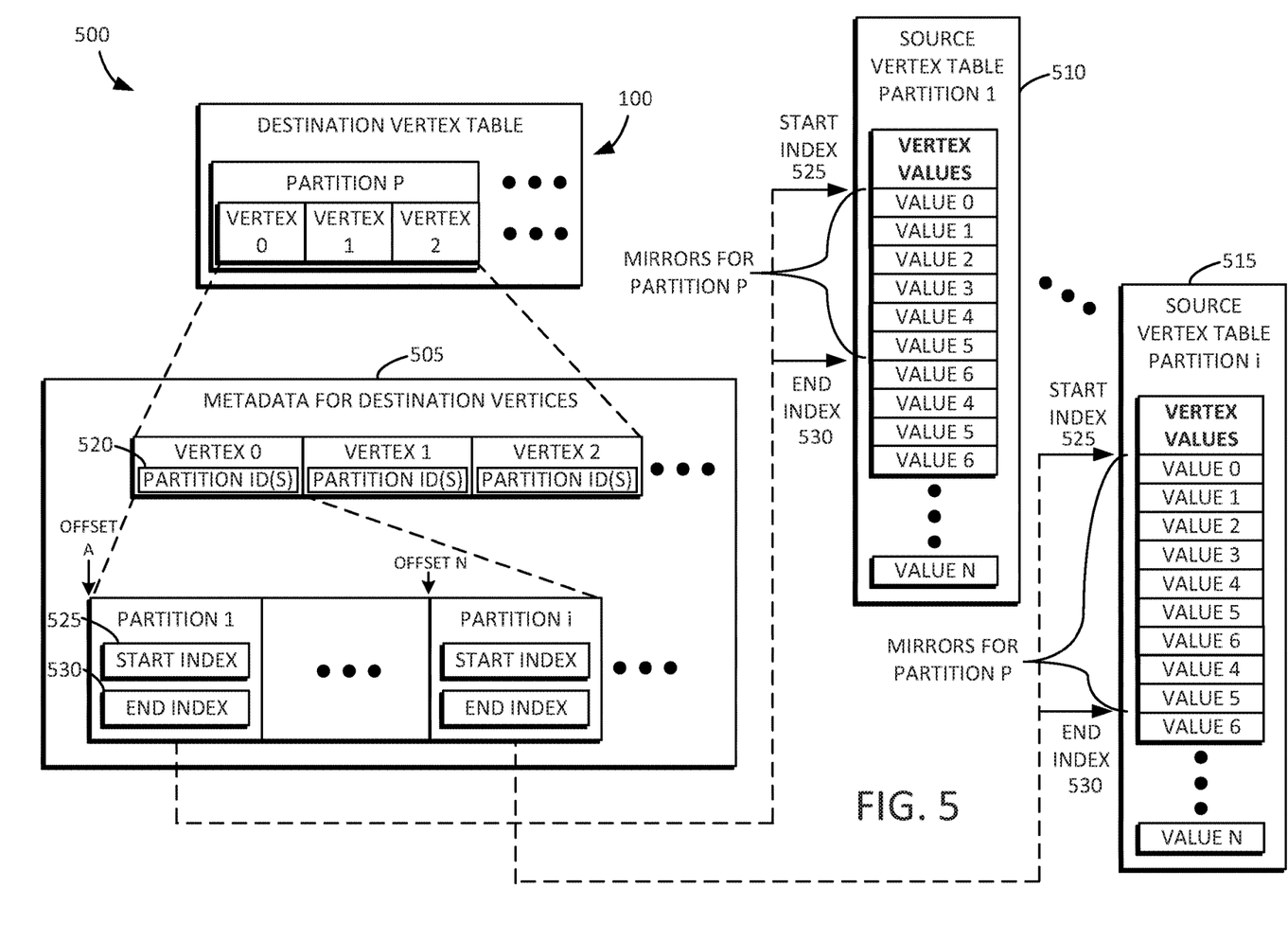
FIG. 5 is an example block and flow diagram of a destination vertex table, metadata for the destination vertices, and multiple source vertex tables in accordance with embodiments disclosed herein.

FIG. 4B is an example block and flow diagram 404 of the computing machine 402 of FIG. 4A including the graph data coordinator logic section 405, and the flow and processing of additional data (e.g., 470 and 475) between the main memory 410 and the SSD 415 in accordance with embodiments disclosed herein. FIG. 5 is an example block and flow diagram 500 of a destination vertex table 100, metadata 505 for the destination vertices, and multiple source vertex tables (e.g., 510 and 515) in accordance with embodiments disclosed herein. Reference is now made to FIGS. 2, 4B, and 5.

When all partitions (e.g., Partition "0," Partition "1," through Partition "N" of FIG. 2) are processed, mirrors 480 (i.e., duplicate vertices) for each vertex are updated at 485 as shown in FIG. 4B. In general, source vertices (e.g., Vertex "A," Vertex "B," etc. of FIG. 2) for each partition (e.g., Partition "0," Partition "1," etc. of FIG. 2) are divided into mirror vertices (e.g., 225 of FIG. 2) and master vertices (e.g., 230 of FIG. 2), with mirrors 225 stored in the order of their partition ID. Hence, all partitions store the mirrors (e.g., 225) for the first partition before the mirrors corresponding to the second partition. This enables the sequential updates for the mirrors 480. To update the value of mirror vertices 480 on different partitions, the destination vertex data (e.g., 470) of each partition may be read from the SSD 415. Based on the indices stored for each partition as metadata, the graph data coordinator logic section 405 may determine the update location for each part of a destination vertex. The metadata 505 maintained for the destination vertex (e.g., Vertex "0" of FIG. 5) includes the partition IDs (e.g., 520) of the mirrors 480 of each vertex, and the offset (e.g., Offset A, Offset N, etc. of FIG. 5) for each partition (e.g., Partition 1, Partition i, etc.). The metadata 505 may include a start index 525 and end index 530 of the mirrors 480 for the given partition (e.g., Partition "P") for each of the other partitions (e.g., Partition 1, Partition i, etc.)

FIG. 5 reveals the metadata structure for each partition. Note that, with the disclosed data structure, updating the mirrors 480 on other partitions (e.g., Partition 1 through Partition i of FIG. 5) can be done in parallel since the data is sequentially read from destination vertices (e.g., Vertex "0," Vertex "1," etc. of Partition "P") and stored on different offsets of each source vertex partition (e.g., Partition "1," Partition "i," etc.). Each partition is processed, iterating the steps disclosed herein, thereby updating the mirrors 480 (e.g., of Partition "P") for the other partitions (e.g., Partition "1," Partition "i," etc.).

Accordingly, after reading a destination vertex for a given partition "P," and reading metadata for the given partition "P," the start/end index of mirrors of the given partition "P" on other partitions can be determined. For vertices in the given partition "P", the graph data coordinator logic section 405 may determine which partitions their mirrors reside in. Advantageously, the updates to partitions are sequential since the source vertices are sorted.

The following Table 1 illustrates pseudo code for updating mirrors as illustrated in FIGS. 4A, 4B, 5, and 6:

| | Updating Mirrors: |
|---|---|
| 1. | For P in Destination_Table_ Partition; |
| 2. | Read P and its Metadata from file; |
| 3. |     For p_i in {0, p−1} // Generating mirror updates for each partition |
| 4. |         For v in P.V |
| 5. |             If v has mirror on p_i |
| 6. |                 out_buf.append(v.value); |
| 7. |             End_If |
| 8. |         End_For |
| 9. |         Write out_buf to SourceTable P_i |
| 10. |     End_For |
| 11. | End_For i |

\* Run time on the order of P \* N, where P is the number of partitions, and N is the number of vertices in the graph.

| | Updating Mirrors (Optimized): |
|---|---|
| 1. | For P in Destination_Table_Partition; |
| 2. | Read P and its Metadata from file; |
| 3. |     For v in P.V //P.V: destination vertex list for partition P |
| 4. |         For part in v.mirror_list_partition |
| 5. |             out _buf[part].append(v. value); |

```
6.              End_For
7.           End_For
8.           For p_i in {0, p-1}
9.              Write out_buf[p_i] to Source Table P_i
10.          End_For
11.       End_For
```

* Run time on the order of N, where N is the number of vertices in the graph.

Figure 6:
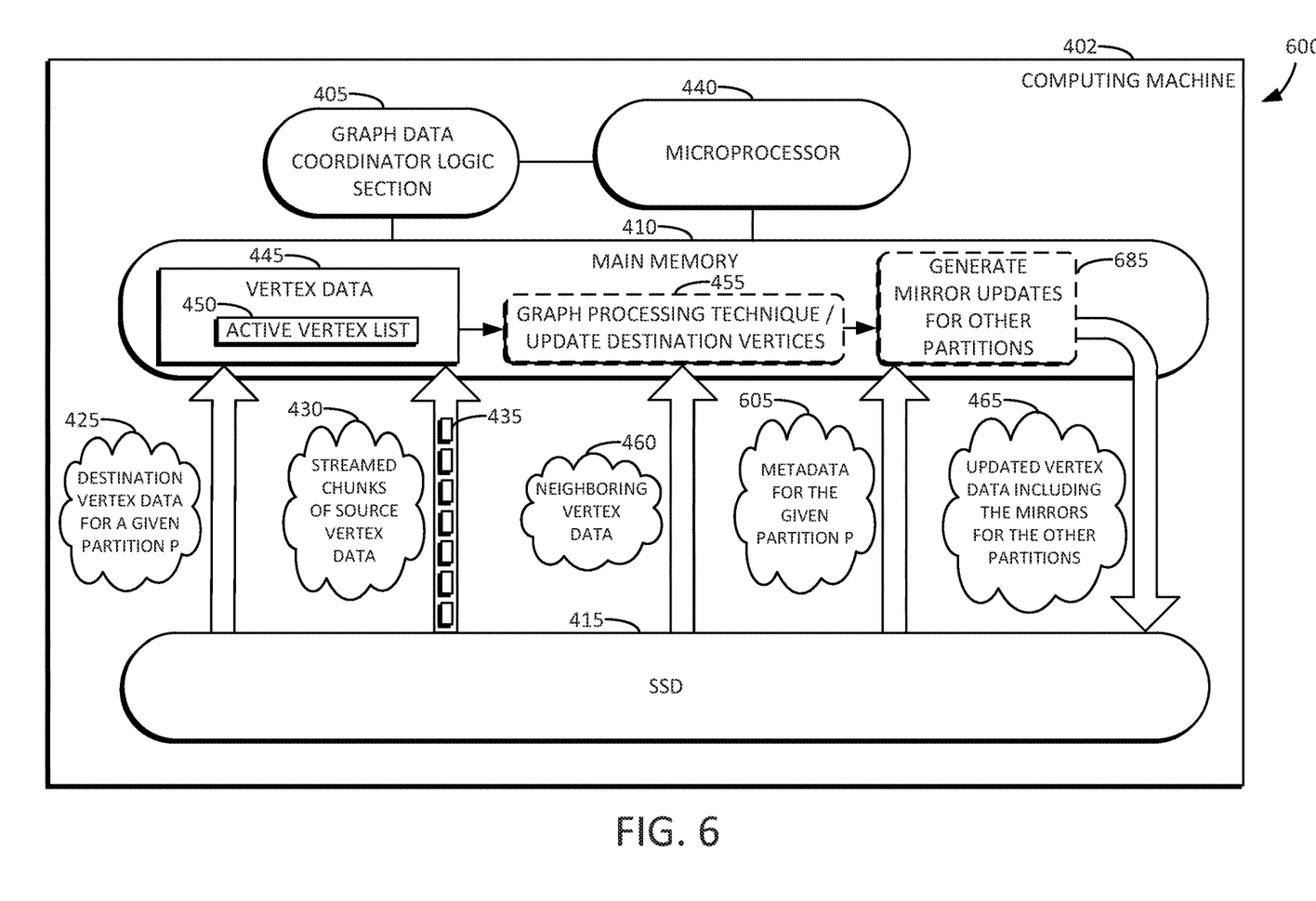
FIG. 6 is an example block and flow diagram of a computing machine including a graph data coordinator logic section, and a more comprehensive flow and processing of data between main memory and an SSD in accordance with embodiments disclosed herein.

FIG. 6 is an example block and flow diagram 600 of a computing machine 402 including a graph data coordinator logic section 405, and a more comprehensive flow and processing of data between the main memory 410 and the SSD 415 in accordance with embodiments disclosed herein. Some of the components and associated reference numerals are discussed in detail above, and therefore, a detailed description of these components is not necessarily repeated. Of particular note, the process illustrated in FIG. 6 combines some elements of FIGS. 4A and 4B into a single more streamlined process. In the previous case, after writing all partitions to the SSD 415, each partition was read again from the SSD 415, the mirror updates generated, and the updates then written back to SSD 415. To reduce the number of I/O accesses, the mirror updates for the other partitions can be done at 685 on-the-fly before writing each partition to the SSD 415. Specifically, meta data 605 for each partition (e.g., partition "P") may be read before writing the updated vertex data to the SSD 415. The mirror updates for the other partitions (e.g., partition "1," partition "i," etc.) associated with a given partition (e.g., partition "P") may be generated at 685, and all of the updated vertex data including the mirrors for the other partitions can be written to the SSD 415 at 465, before moving to a next partition for a repeat of each step. As shown in FIG. 6, this approach does not require additional reads of destination vertex data (e.g., 470) associated with the approach illustrated in FIG. 4B.

This disclosure devises a greedy partitioning technique for vertex data in external graph processing. Vertex data for each partition is sufficiently small to fit in the main memory, thereby only needing to pin destination vertex data for the current partition in the memory. The rest of the data may be transferred and processed in memory in a streaming fashion. Source vertices may be stored for each partition in a sorted order. At the time of updating mirrors, all updates may be sequential. Accesses to source vertex data and edge data can be done in parallel (i.e., enabling high levels of parallelism), with each thread reading a different chunk of source vertex data and updating destination vertex data. The partitioning may be performed prior to the main process execution, thereby resulting in a one-time cost since it only happens once in the pre-processing step. Provided herein is the data structure for each partition to enable sequential accesses. Mirrors may be updated at the end of each iteration. Metadata for each partition may be used to extract the mirrors' positions on other partitions. Destination vertex data may be read for each partition and mirrors may be updated in parallel.

Figure 7:
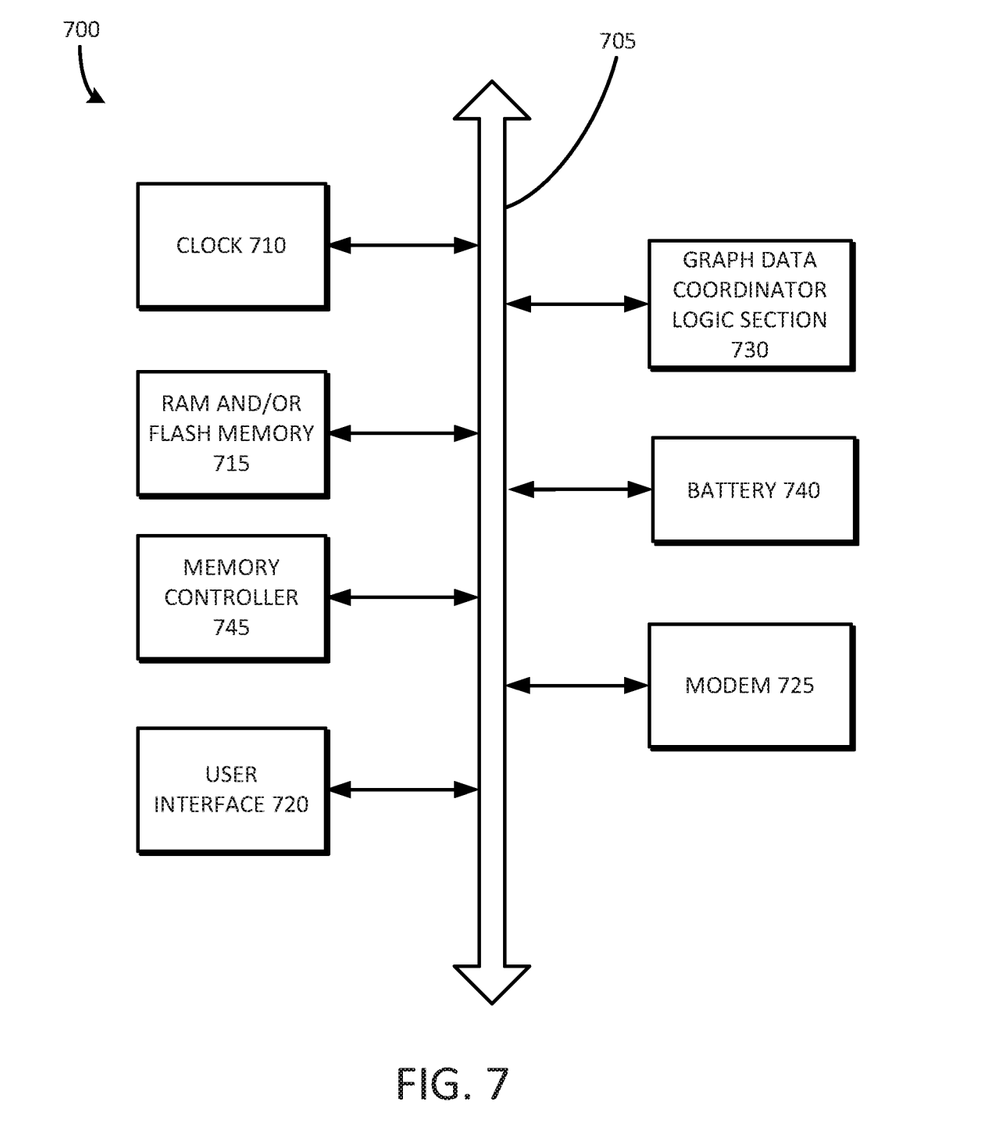
FIG. 7 is an example block diagram of a computing system including a graph data coordinator logic section according to embodiments disclosed herein.

FIG. 7 is an example block diagram of a computing system 700 including a graph data coordinator logic section 730 according to embodiments of the inventive concept as disclosed herein. The graph data coordinator logic section 730 may be the same as the graph data coordinator logic section 405 disclosed herein, and may be electrically connected to a system bus 705. The computing system 700 may also include a clock 710, a random access memory (RAM) and/or flash memory 715, a memory controller 745, a user interface 720, a modem 725 such as a baseband chipset, and/or automated test equipment (ATE) 735, any or all of which may be electrically coupled to the system bus 705.

If the computing system 700 is a mobile device, it may further include a battery 740, which powers the computing system 700. Although not shown in FIG. 7, the computing system 700 may further include an application chipset, a camera image processor (CIS), a mobile DRAM, and the like. The memory controller 745 and the flash memory 715 may constitute a solid state drive/disk (SSD), which uses a nonvolatile memory to store data.

In example embodiments, the computing system 700 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The various operations of methods described above may be performed by any suitable means capable of performing the operations, such as various hardware and/or software component(s), circuits, and/or module(s).

Embodiments may include a computer-implemented method for partitioning graph data for large-scale graph processing. The method may include, in a partitioning pre-processing step, assigning a plurality of destination vertices to a plurality of partitions such that each destination vertex of the plurality of destination vertices is uniquely assigned to only one partition from among the plurality of partitions. The method may include, in a main execution of external graph processing step, (i) loading a given partition of destination vertices from among the plurality of partitions from a solid state drive (SSD) into a main memory of a computing machine, (ii) streaming one or more chunks of source vertex data from the SSD into the main memory of the computing machine, and (iii) performing graph processing based at least on the loaded given partition of destination vertices and the streamed one or more chunks of source vertex data.

The computer-implemented method may further include updating the loaded given partition of destination vertices based at least on the streamed one or more chunks of source vertex data. The method may further include writing the updated partition of destination vertices from the main memory to the SSD. The method may further include loading the updated partition of destination vertices from the SSD to the main memory. The method may further include generating mirror updates to mirrors associated with destination vertices for a plurality of other partitions associated with the given partition. The method may further include generating mirror updates to mirrors associated with destination vertices for a plurality of other partitions associated with the given partition. The method may further include writing the updated partition of destination vertices from the main memory to the SSD.

Generating mirror updates may further include updating the mirrors sequentially based on partition identifier (ID). Writing the updated partition of destination vertices may further include storing the mirrors for the given partition sequentially in each of the plurality of other partitions. The computing machine may be a single discrete machine. The partitioning pre-processing step may further include: for each edge "→" of an edge list in which vertex "u" is associated with vertex "v" in a "u→v" relationship, determining whether the vertex "v" is already assigned to a partition "P." In response to determining that the vertex "v" is already assigned to the partition "P," the method may include determining whether the vertex "u" already exists on the partition "P." In response to determining that the vertex "u" does not already exist on the partition "P," the method may include adding the vertex "u" to the partition "P." The partitioning pre-processing step may include: in response to determining that the vertex "v" is not already assigned to the partition "P," determining whether the vertex "u" is already assigned to a set of partitions {P1, P2, . . . through PN). In response to determining that the vertex "u" is already assigned to the set of partitions {P1, P2, . . . through PN), the method may include choosing a partition from among the set of partitions with a least number of edges, and adding the vertex "v" to the chosen partition.

The partitioning pre-processing step may further include, in response to determining that the vertex "u" is not already assigned to the set of partitions {P1, P2, . . . through PN): assigning the vertex "u" to the partition from among the set of partitions with the least number of edges, and assigning the vertex "v" to the partition from among the set of partitions with the least number of edges. The computing machine may include a microprocessor and a graph data coordinator logic section. The partitioning pre-processing step may be performed by the microprocessor and the graph data coordinator logic section. The main execution of external graph processing step may be performed by the microprocessor and the graph data coordinator logic section.

Some embodiments include a computing machine, comprising a graph data coordinator logic section configure to perform a partitioning pre-processing step to assign a plurality of destination vertices to a plurality of partitions such that each destination vertex of the plurality of destination vertices is uniquely assigned to only one partition from among the plurality of partitions. The graph data coordinator logic section is configured to perform a main execution of external graph processing step. The graph data coordinator logic section is configured to load a given partition of destination vertices from among the plurality of partitions from a solid state drive (SSD) into a main memory of a computing machine. The graph data coordinator logic section is configured to stream one or more chunks of source vertex data from the SSD into the main memory of the computing machine. The graph data coordinator logic section is configured to perform graph processing based at least on the loaded given partition of destination vertices and the streamed one or more chunks of source vertex data.

The graph data coordinator logic section is configured to update the loaded given partition of destination vertices based at least on the streamed one or more chunks of source vertex data. The graph data coordinator logic section is configured to write the updated partition of destination vertices from the main memory to the SSD. The graph data coordinator logic section is configured to: load the updated partition of destination vertices from the SSD to the main memory, and generate mirror updates to mirrors associated with destination vertices for a plurality of other partitions associated with the given partition.

The graph data coordinator logic section is configured to generate mirror updates to mirrors associated with destination vertices for a plurality of other partitions associated with the given partition, and write the updated partition of destination vertices from the main memory to the SSD. The graph data coordinator logic section is configured to update the mirrors sequentially based on partition identifier (ID). The graph data coordinator logic section is configured to write the updated partition of destination vertices comprises storing the mirrors for the given partition sequentially in each of the plurality of other partitions.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single discrete machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computer-implemented method for partitioning graph data for large-scale graph processing, the method comprising:
   in a partitioning pre-processing step, assigning first and second destination vertices to first and second partitions such that the first and second destination vertices are uniquely assigned to one partition from among the first and second partitions;
   in a graph processing operation, (i) loading a given partition of destination vertices from among the first and second partitions from a solid state drive (SSD) into a main memory of a computing machine, (ii) streaming one or more chunks of source vertex data from the SSD into the main memory of the computing machine, and (iii) performing graph processing based at least on the given partition of destination vertices and the streamed one or more chunks of source vertex data;
   updating the given partition of destination vertices based at least on the streamed one or more chunks of source vertex data;
   generating mirror updates for other partitions associated with the given partition; and
   writing the updated partition of destination vertices from the main memory to the SSD,
   wherein generating mirror updates further comprises updating the mirrors sequentially based on partition identifier (ID).

2. The computer-implemented method of claim 1, further comprising writing the updated partition of destination vertices from the main memory to the SSD.

3. The computer-implemented method of claim 2, further comprising:
   loading the updated partition of destination vertices from the SSD to the main memory.

4. The computer-implemented method of claim 1, wherein writing the updated partition of destination vertices comprises storing the mirrors for the given partition sequentially in the other partitions.

5. The computer-implemented method of claim 1, wherein the computing machine is a single machine.

6. The computer-implemented method of claim 1, wherein:
   the computing machine includes a microprocessor and a graph data coordinator logic section; and
   the partitioning pre-processing step is performed by the microprocessor and the graph data coordinator logic section.

7. The computer-implemented method of claim 1, wherein:
   the computing machine includes a microprocessor and a graph data coordinator logic section; and
   the graph processing operation is performed by the microprocessor and the graph data coordinator logic section.

8. A computer-implemented method for partitioning graph data for large-scale graph processing, the method comprising:
   in a partitioning pre-processing step, assigning first and second destination vertices to first and second partitions such that the first and second destination vertices are uniquely assigned to one partition from among the first and second partitions; and
   in a graph processing operation, (i) loading a given partition of destination vertices from among the first and second partitions from a solid state drive (SSD) into a main memory of a computing machine, (ii) streaming one or more chunks of source vertex data from the SSD into the main memory of the computing machine, and (iii) performing graph processing based at least on the given partition of destination vertices and the streamed one or more chunks of source vertex data,
   wherein the partitioning pre-processing step further comprises:
   for each edge "4" of an edge list in which vertex "u" is associated with vertex "v" in a "u→v" relationship, determining whether the vertex "v" is already assigned to a partition "P";
   in response to determining that the vertex "v" is already assigned to the partition "P," determining whether the vertex "u" already exists on the partition "P"; and
   in response to determining that the vertex "u" does not already exist on the partition "P," adding the vertex "u" to the partition "P."

9. The computer-implemented method of claim 8, wherein the partitioning pre-processing step further comprises:
  in response to determining that the vertex "v" is not already assigned to the partition "P," determining whether the vertex "u" is already assigned to a set of partitions {P1, P2, . . . through PN}; and
  in response to determining that the vertex "u" is already assigned to the set of partitions {P1, P2, . . . through PN}:
    choosing a partition from among the set of partitions with a least number of edges; and
    adding the vertex "v" to the chosen partition.

10. The computer-implemented method of claim 9, wherein the partitioning pre-processing step further comprises:
  in response to determining that the vertex "u" is not already assigned to the set of partitions {P1, P2, . . . through PN}:
    assigning the vertex "u" to the partition from among the set of partitions with the least number of edges; and
    assigning the vertex "v" to the partition from among the set of partitions with the least number of edges.

11. A computing machine, comprising:
  a microprocessor;
  a graph data coordinator logic section configured to perform a partitioning pre-processing step to assign first and second destination vertices to first and second partitions such that the first and second destination vertices are uniquely assigned to one partition from among the first and second partitions, wherein:
  the graph data coordinator logic section is configured to:
  perform a graph processing operation;
  load a given partition of destination vertices from among the first and second partitions from a solid state drive (SSD) into a main memory of a computing machine;
  stream one or more chunks of source vertex data from the SSD into the main memory of the computing machine;
  perform graph processing based at least on the given partition of destination vertices and the streamed one or more chunks of source vertex data;
  update the given partition of destination vertices based at least on the streamed one or more chunks of source vertex data;
  generate mirror updates for other partitions associated with the given partition;
  write the updated partition of destination vertices from the main memory to the SSD; and
  update the mirrors sequentially based on partition identifier (ID).

12. The computing machine of claim 11, wherein the graph data coordinator logic section is configured to write the updated partition of destination vertices from the main memory to the SSD.

13. The computing machine of claim 12, wherein the graph data coordinator logic section is configured to:
  load the updated partition of destination vertices from the SSD to the main memory.

14. A computing machine, comprising:
  a microprocessor;
  a graph data coordinator logic section configured to perform a partitioning pre-processing step to assign first and second destination vertices to first and second partitions such that the first and second destination vertices are uniquely assigned to one partition from among the first and second partitions, wherein:
  the graph data coordinator logic section is configured to:
  perform a graph processing operation;
  load a given partition of destination vertices from among the first and second partitions from a solid state drive (SSD) into a main memory of a computing machine;
  stream one or more chunks of source vertex data from the SSD into the main memory of the computing machine;
  perform graph processing based at least on the given partition of destination vertices and the streamed one or more chunks of source vertex data;
  update the given partition of destination vertices based at least on the streamed one or more chunks of source vertex data;
  generate mirror updates for other partitions associated with the given partition;
  write the updated partition of destination vertices from the main memory to the SSD; and
  store the mirrors for the given partition sequentially in the other partitions.

* * * * *